(12) United States Patent
Lu et al.

(10) Patent No.: US 8,670,528 B2
(45) Date of Patent: Mar. 11, 2014

(54) COMMUNICATION DEVICE AND METHOD FOR EVALUATING LEVEL OF IMPORTANCE OF MISSED INCOMING CALL

(71) Applicants: Fu Tai Hua Industry (Shenzhen) Co., Ltd., Shenzhen (CN); Hon Hai Precision Industry Co., Ltd., New Taipei (TW)

(72) Inventors: Xin Lu, Shenzhen (CN); Shih-Fang Wong, New Taipei (TW); Xue-Shun Liu, Shenzhen (CN); Jian-Jian Zhu, Shenzhen (CN); Fei Wang, Shenzhen (CN); Huan-Huan Zhang, Shenzhen (CN); Biao-Geng Zhong, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 3 days.

(21) Appl. No.: 13/851,965

(22) Filed: Mar. 28, 2013

(65) Prior Publication Data

US 2013/0266130 A1    Oct. 10, 2013

(30) Foreign Application Priority Data

Apr. 6, 2012    (CN) .......................... 2012 1 0098866

(51) Int. Cl.
*H04M 1/64*    (2006.01)

(52) U.S. Cl.
USPC ..................... 379/88.12; 455/414.1; 455/566; 455/567

(58) Field of Classification Search
USPC ................. 379/88.11, 88.12, 142.01, 201.02, 379/207.15; 455/414.1, 566, 567
See application file for complete search history.

(56) References Cited

U.S. PATENT DOCUMENTS

| 2006/0285661 | A1* | 12/2006 | Patel et al. | 379/88.16 |
| 2007/0133771 | A1* | 6/2007 | Stifelman et al. | 379/142.01 |
| 2007/0167153 | A1* | 7/2007 | Cho et al. | 455/414.1 |
| 2008/0039152 | A1* | 2/2008 | Arisawa | 455/567 |
| 2012/0157067 | A1* | 6/2012 | Turner et al. | 455/417 |

* cited by examiner

Primary Examiner — Oleg Asanbayev
(74) Attorney, Agent, or Firm — Altis Law Group, Inc.

(57) ABSTRACT

A computerized method is implemented by a communication device for evaluating levels of importance of missed incoming calls. One or more reference parameters in relation to incoming calls received by the communication device are defined, a function for evaluating levels of importance of the missed incoming calls is formed using the one or more reference parameters. When an incoming call is received by the communication device, whether the received incoming call is missed is determined If the received incoming call is missed, the one or more reference parameters in relation to the received incoming call are obtained. A level of importance of the missed incoming call is evaluated by applying the obtained one or more reference parameters to the function.

12 Claims, 3 Drawing Sheets

COMMUNICATION DEVICE AND METHOD FOR EVALUATING LEVEL OF IMPORTANCE OF MISSED INCOMING CALL

BACKGROUND

1. Technical Field

Embodiments of the present disclosure relate to communication devices, and more particularly to, a method for evaluating levels of importance of missed incoming calls of a communication device.

2. Description of Related Art

Incoming calls of a communication device may be missed by a user due to various reasons. However, there is no method to evaluate the level of importance of the missed calls. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
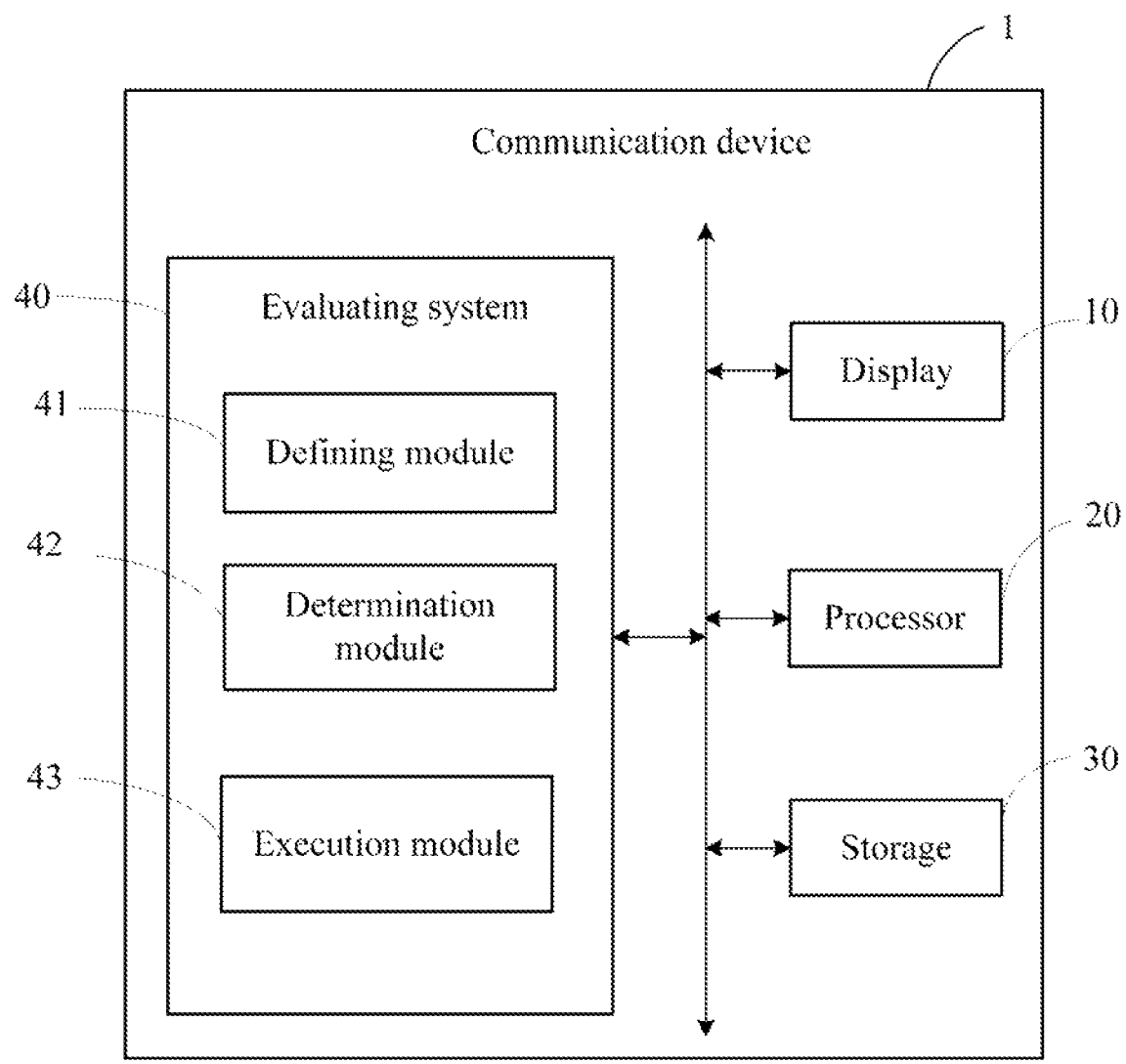
FIG. 1 is a schematic block diagram illustrating one embodiment of a communication device.

FIG. 1 is a schematic block diagram illustrating one embodiment of a communication device 1. In the embodiment, the communication device 1 includes an evaluating system 40, a display 10, a processor 20, and a storage 30. The communication device 1 may be, for example, a smart phone, a personal digital assistant, a fixed telephone, or other similar device.

The evaluating system 40 is configured for managing incoming calls of the communication device 1. The evaluating system 40 may include a plurality of programs in the form of one or more computerized instructions stored in the storage 30 and executed by the processor 20 to perform operations of the communication device 1. In the embodiment, the evaluating system 40 includes a defining module 41, a determination module 42, and an execution module 43.

In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 2:
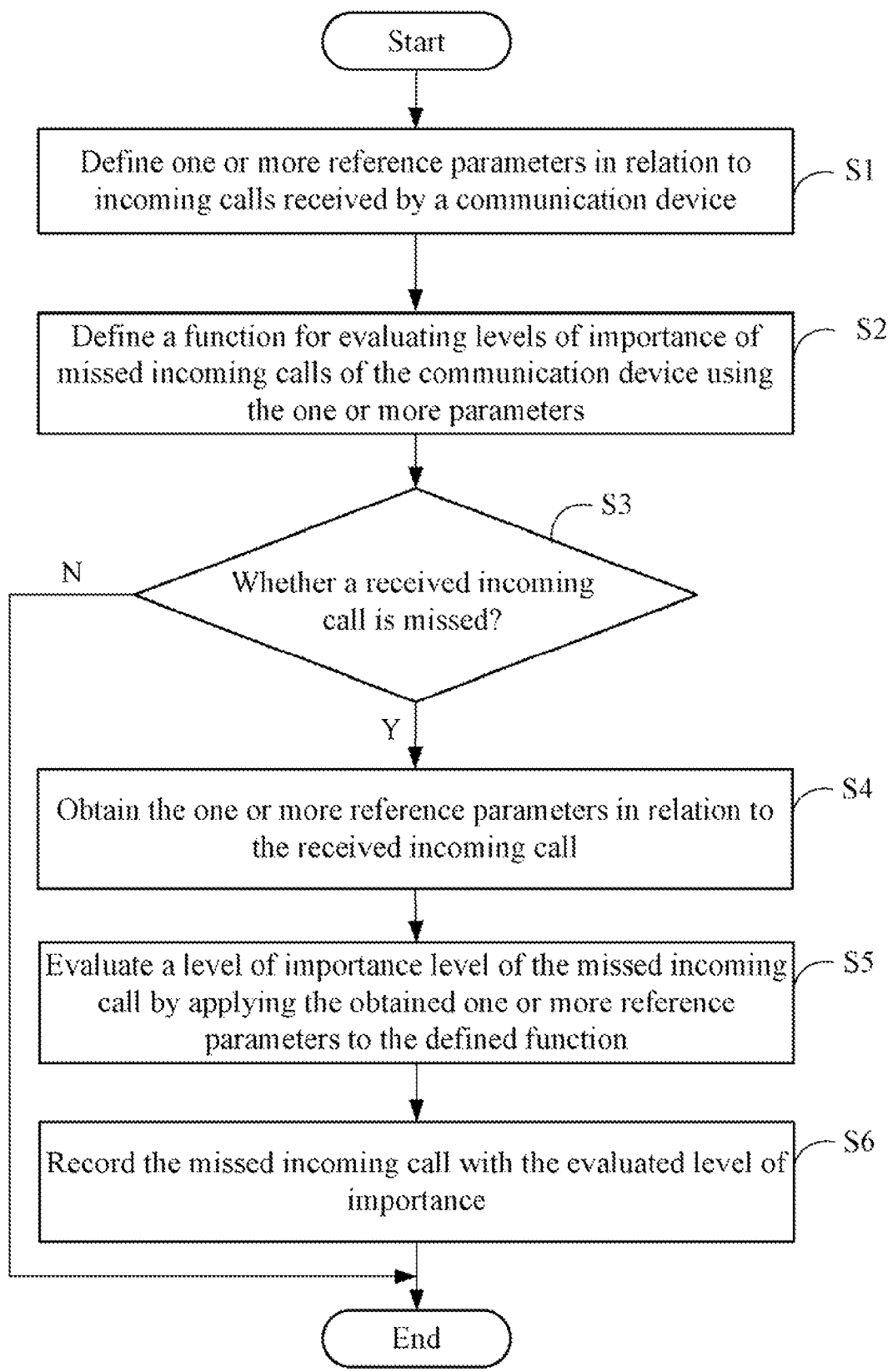
FIG. 2 is a flowchart of one embodiment of a method for evaluating importance of missed incoming calls received by the communication device of FIG. 1.

Referring to FIG. 2, a flowchart of one embodiment of a method for managing incoming calls of the communication device 1 using the evaluating system 40 of FIG. 1 is shown. Depending on the embodiment, additional steps may be added, others removed, and the ordering of the steps may be changed.

In step S1, the defining module 41 defines one or more reference parameters in relation to incoming calls received by the communication device 1. In the embodiment, the one or more reference parameters include a first parameter X1, a second parameter X2, a third parameter X3, and a fourth parameter X4. The first parameter X1 represents a period of ring time of an incoming call when the incoming call is held on the line until the incoming call is processed (e.g., answered, rejected, or missed). The second parameter X2 represents a contact group in which the incoming call number is stored. The incoming call number is defined to be a phone number of the incoming call. In one example, the communication device 1 includes a contact list that is organized in a plurality of contact groups, such as the groups of "family," "friend," and "others." A value of the second parameter X2 is selected from a plurality of predetermined constants, such as 3, 2, 1. Each of the predetermined constants represents one of the contact groups "family," "friend," and "others," respectively. For example, if the incoming call number is stored in the "family" group of the contact list, the value of the second parameter X2 in relation to the incoming call is 3. The third parameter X3 represents how many times that the incoming call number has communicated with the communication device 1 during a predetermined time period (e.g., 15 or 30 days). The fourth parameter X4 represents a total talk time (e.g., 30 or 50 minutes) that the communication device 1 engages with the incoming call number during answered calls within the predetermined time period. The reference information of these parameters including the first, second, third, and fourth parameters are recorded in the storage 30.

In step S2, the defining module 41 defines a function for evaluating levels of importance of missed incoming calls of the communication device 1 using the one or more parameters. In the embodiment, the function is a linear function, which is $Y = a_0 + a_1 X_1 + a_2 X_2 + a_3 X_3 + a_4 X_4$. The $a_0$, $a_1$, $a_2$, $a_3$, and $a_4$ are predetermined coefficients. In the embodiment, solution Y of the linear function is defined to be an importance value of a missed incoming call, which indicates the level of importance of the missed incoming call. The value range for the solution Y is a predetermined range, such as [0,100]. The level of importance of the missed incoming calls may be selected from a plurality of predetermined levels according to the value range for variable Y. For example, the predetermined range may be divided into a first, second, and third value intervals, which respectively are [0, 40], (40,80], (80, 100]. Correspondingly, the predetermined levels may be, for example, low level, middle level, and high level. The coefficients $a_0$, $a_1$, $a_2$, $a_3$, and $a_4$ are determined as follows.

First, n groups of sample values $\{Y_i, X_{1i}, X_{2i}, X_{3i}, X_{4i}, 0 \leq i \leq n\}$ are determined by a user. For example, the user may determine the n groups of sample values according to reference information of a plurality of missed incoming calls recorded in the communication device 1. Second, the n groups of sample values are applied to the function to obtain an equation $Y_i = (a_0 + a_1 X_{1i} + a_2 X_{2i} + a_3 X_{3i} + a_4 X_{4i})$, $0 \leq i \leq n$. Third, the generalized least squares (GLS) method is used to the obtained equation to calculate the coefficients $a_0$, $a_1$, $a_2$, $a_3$, and $a_4$.

In step S3, when an incoming call is received by the communication device 1, the determination module 42 determines whether the received incoming call is missed by the user. If the received incoming call is missed, the procedure goes to step S4. If the received incoming call is not missed, the procedure terminates.

In step S4, the execution module 43 obtains the one or more reference parameters including the first, second, third, fourth parameters in relation to the received incoming call. In the embodiment, the execution module 43 can obtain the one or more parameters from the storage 30.

In step S5, the execution module 43 evaluates a level of importance of the missed incoming call by applying the obtained one or more reference parameters to the function $Y=a_0+a_1X_1+a_2X_2+a_3X_3+a_4X_4$. In the embodiment, the execution module 43 first calculates a solution Y of the function by applying the obtained one or more reference parameters to the function $Y=a_0+a_1X_1+a_2X_2+a_3X_3+a_4X_4$, and then determines the level of importance of the missed incoming call according to the solution Y of the function. For example, if the solution Y of the function is in the first value interval, the level of importance of the missed incoming call may be the low level. If the solution Y of the function is in the second value interval, the level of importance of the missed incoming call may be the middle level. If the solution Y of the function is in the third value interval, the level of importance of the missed incoming call may be the high level.

Figure 3:
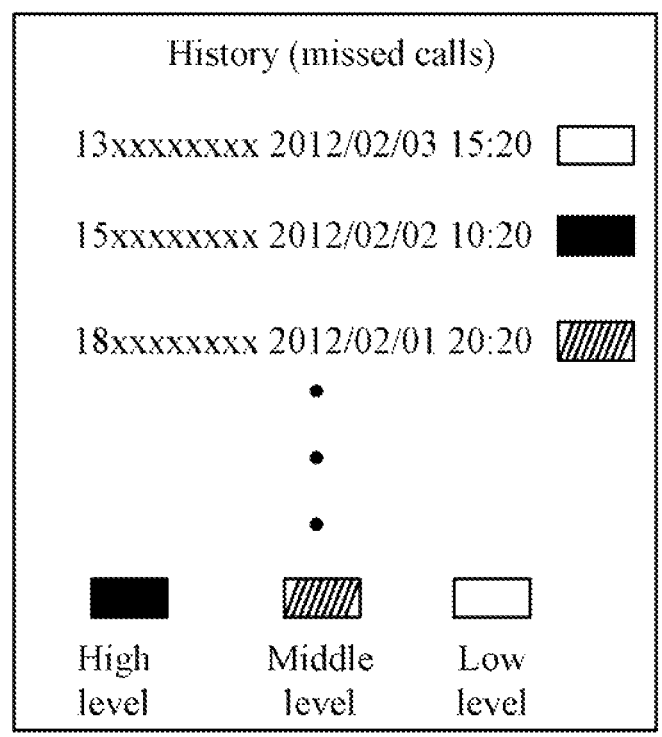
FIG. 3 is a schematic diagram shown recorded missed incoming calls with an evaluated level of importance of each missed incoming call.

In step S6, the execution module 43 records the missed incoming call with the evaluated level of importance in the storage 30, the procedure terminates. For example, as shown in FIG. 3, the missed incoming call and the evaluated level of importance of the missed incoming call may be recorded in a communication history of the communication device 1. Thus, when the recorded missed incoming call is displayed on the display 10, the user can decide whether to reply to the missed incoming call after considering the level of importance of the missed incoming call.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for evaluating levels of importance of missed incoming calls of a communication device, the method comprising:
defining one or more reference parameters in relation to incoming calls received by the communication device, and defining a function for evaluating the levels of importance of the missed incoming calls using the one or more reference parameters;
determining whether an incoming call is missed when the incoming call is received by the communication device;
obtaining the one or more reference parameters in relation to the received incoming call when the received incoming call is missed; and
evaluating a level of importance of the missed incoming call by applying the obtained one or more reference parameters to the defined function;
wherein the one or more reference parameters comprise a first parameter X1, a second parameter X2, a third parameter X3, and a fourth parameter X4, the first parameter X1 represents a period of ring time of the incoming call when the incoming call is held on the line until the incoming call is processed, the second parameter X2 represents a contact group in which an incoming call number of the incoming call is stored, the third parameter X3 represents a number of times that the incoming call number of the incoming call has communicated with the communication device during a predetermined time period, and the fourth parameter X4 represents a total talk time that the communication device engages with the incoming call number of the incoming call during answered calls within the predetermined time period;
wherein the defined function is a linear function: $Y=a_0+a_1X_1+a_2X_2+a_3X_3+a_4X_4$, where $a_0$, $a_1$, $a_2$, $a_3$, and $a_4$ are predetermined coefficients;
wherein the coefficients $a_0$, $a_1$, $a_2$, $a_3$ and $a_4$ are predetermined by:
determining n groups of sample values $\{Y_i, X_{1i}, X_{2i}, X_{3i}, X_{4i}, 0 \leq i \leq n\}$ by a user; applying the n groups of sample values to the defined function to obtain an equation $Y_i=(a_0+a_1X_1+a_2X_2+a_3X_3+a_4X_4)$, $0 \leq i \leq n$; and
calculating the coefficients $a_0$, $a_1$, $a_2$, $a_3$ and $a_4$ using a generalized least squares method based on the obtained equation;
wherein the level of importance of the missed incoming call is evaluated by:
calculating a solution Y of the linear function by applying the obtained one or more reference parameters to the linear function; and
determining the level of importance of the missed incoming call according to the solution Y of the linear function.

2. The method according to claim 1, further comprising:
recording the missed incoming call with the evaluated level of importance in a storage of the communication device.

3. The method according to claim 1, wherein the communication device comprises a contact list that is organized in a plurality of contact groups, and each of the contact groups is configured for storing phone numbers of different contacts.

4. The method according to claim 3, wherein a value of the second parameter X2 is selected from a plurality of predetermined constants, and each of the predetermined constants represents one of the contact groups, respectively.

5. The method according to claim 1, wherein the value range for the solution Y is a predetermined range, which is divided into a plurality of value intervals.

6. The method according to claim 5, wherein the level of importance of the missed incoming call is selected from a plurality of predetermined levels, and each of the predetermined levels corresponds to one of the value intervals.

7. A communication device, comprising:
a storage, a processor, and one or more programs stored in the storage and executed by the processor, the one or more programs comprising:
a defining module that defines one or more reference parameters in relation to incoming calls received by the communication device, and defines a function for evaluating levels of importance of missed incoming calls using the one or more reference parameters;
a determination module that determines whether an incoming call is missed when the incoming call is received by the communication device; and
an execution module that obtains the one or more reference parameters in relation to the received incoming call, when the received incoming call is missed, and evaluates a level of importance of the missed incoming call by applying the obtained one or more reference parameters to the function;
wherein the one or more reference parameters comprise a first parameter X1, a second parameter X2, a third parameter X3, and a fourth parameter X4, the first parameter X1 represents a period of ring time of the incoming call when the incoming call is held on the line until the incoming call is processed, the second parameter X2 represents a contact group in which an incoming call number of the incoming call is stored, the third parameter X3 represents a number of times that the incoming call number of the incoming call has communicated with the communication device during a predetermined time period, and the fourth parameter X4 represents a total talk time that the communication device engages with the incoming call number of the incoming call during answered calls within the predetermined time period;

wherein the defined function is a linear function: $Y=a_0+a_1X_1+a_2X_2+a_3X_3+a_4X_4$, where $a_0$, $a_1$, $a_2$, $a_3$, and $a_4$ are predetermined coefficients;

wherein the coefficients $a_0$, $a_1$, $a_2$, $a_3$ and $a_4$ are predetermined by:

determining n groups of sample values $\{Y_i, X_{1i}, X_{2i}, X_{3i}, X_{4i}, 0 \leq i \leq n\}$ by a user; applying the n groups of sample values to the defined function to obtain an equation $Y_i=(a_0+a_1X_1+a_2X_2+a_3X_3+a_4X_4)$, $0 \leq i \leq n$; and calculating the coefficients $a_0$, $a_1$, $a_2$, $a_3$ and $a_4$ using a generalized least squares method based on the obtained equation;

wherein the level of importance of the missed incoming call is evaluated by:

calculating a solution Y of the linear function by applying the obtained one or more reference parameters to the linear function; and determining the level of importance of the missed incoming call according to the solution Y of the linear function.

8. The communication device according to claim 7, wherein the execution module further records the missed incoming call with the evaluated level of importance in the communication device.

9. The communication device according to claim 7, wherein the communication device further comprises a contact list that is organized in a plurality of contact groups, and each of the contact groups is configured for storing phone numbers of different contacts.

10. The communication device according to claim 9, wherein a value of the second parameter X2 is selected from a plurality of predetermined constants, and each of the predetermined constants represents one of the contact groups, respectively.

11. The communication device according to claim 7, wherein the value range for the solution Y is a predetermined range, which is divided into a plurality of value intervals.

12. The communication device according to claim 11, wherein the level of importance of the missed incoming call is selected from a plurality of predetermined levels, and each of the predetermined levels corresponds to one of the value intervals.

* * * * *